(12) United States Patent
Grace et al.

(10) Patent No.: US 11,899,446 B2
(45) Date of Patent: Feb. 13, 2024

(54) VERIFYING AUTHORIZED PERSONNEL FOR INTERACTION WITH AUTONOMOUS VEHICLES

(71) Applicant: GM Cruise Holdings LLC, San Francisco, CA (US)

(72) Inventors: Nestor Grace, San Francisco, CA (US); Dogan Gidon, Berkeley, CA (US); Diego Plascencia-Vega, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 245 days.

(21) Appl. No.: 17/459,114

(22) Filed: Aug. 27, 2021

(65) Prior Publication Data

US 2023/0060142 A1    Mar. 2, 2023

(51) Int. Cl.
| | |
|---|---|
| *G05D 1/00* | (2006.01) |
| *B60W 60/00* | (2020.01) |
| *G06F 21/31* | (2013.01) |
| *H04W 4/02* | (2018.01) |
| *H04W 4/40* | (2018.01) |
| *G06V 20/56* | (2022.01) |
| *G06V 40/10* | (2022.01) |

(52) U.S. Cl.
CPC ......... *G05D 1/0011* (2013.01); *B60W 60/001* (2020.02); *G06F 21/31* (2013.01); *G06V 20/56* (2022.01); *G06V 40/10* (2022.01); *H04W 4/025* (2013.01); *H04W 4/40* (2018.02); *B60W 2556/45* (2020.02)

(58) Field of Classification Search
CPC .. H04W 4/025; B60W 60/0021; B60W 30/06; G05D 1/0044; G05D 1/0022; B60R 25/00; G06Q 10/06; G06V 20/56; G06F 1/3231
See application file for complete search history.

(56) References Cited

U.S. PATENT DOCUMENTS

| | | | |
|---|---|---|---|
| 10,743,136 B1 | 8/2020 | Schmidt et al. | |
| 2015/0177817 A1* | 6/2015 | Badri | G06F 1/3231 713/320 |
| 2022/0063665 A1* | 3/2022 | Golgiri | B60W 30/06 |

(Continued)

FOREIGN PATENT DOCUMENTS

| | | | | | |
|---|---|---|---|---|---|
| CN | 109795446 A | * | 5/2019 | ............. | B60R 25/00 |
| CN | 106651175 B | * | 1/2021 | ............. | G06Q 10/06 |
| DE | 102019214713 A1 | * | 4/2021 | ............. | B60R 25/00 |

*Primary Examiner* — Yuri Kan
(74) *Attorney, Agent, or Firm* — Akona IP PC

(57) ABSTRACT

An autonomous vehicle (AV) uses an authentication system to verify that a person on the street attempting to control behavior of the AV is authorized to do so. An authorized person (e.g., a construction worker or a police officer) has an associated beacon that provides a beacon signal, such as a visual symbol or wireless signal. The AV perceives the beacon signal and transmits it to the authentication system. The authentication system looks up the beacon signal in a database and retrieves conditions associated with the beacon signal. If the authentication system and/or AV confirms that the beacon signal is in the database, and the conditions under which the person associated with the beacon signal is authorized to control the AV are met, the AV follows instructions from the person.

20 Claims, 6 Drawing Sheets

(56) References Cited

U.S. PATENT DOCUMENTS

2022/0176999 A1\* 6/2022 Golgiri ................ G05D 1/0022
2022/0297698 A1\* 9/2022 Gao .................. B60W 60/0021
2022/0357741 A1\* 11/2022 Kim ..................... G05D 1/0044

\* cited by examiner

| Authorized Personnel | Beacon Type | Time Active | Location | Other Identifier(s) | Permissions |
|---|---|---|---|---|---|
| Construction Crew | Dynamic QR code on sign | Monday-Saturday 7am-5pm | Between mile 5 and mile 7 on Route 1 | • Crew member wearing orange vest | • Change lane on planned roadway<br>• Redirect to another known roadway<br>• Instruct AV to stop and go along a roadway |
| Crossing Guard | Static QR code worn by crossing guard | Monday-Friday 7am-9am and 2pm-4pm | 500 meter radius of elementary school | • Crossing guard wearing yellow vest<br>• Children in the area | • Instruct AV to stop and go along a roadway |
| Fleet Employee | Bluetooth beacon device | Any time | Any location | • Match face of beacon holder to employee badge | • Change lane on planned roadway<br>• Redirect to known roadway<br>• Instruct AV to stop and go along a roadway<br>• Pull over AV<br>• Enter AV<br>• Access AV computer systems |

Figure 6

VERIFYING AUTHORIZED PERSONNEL FOR INTERACTION WITH AUTONOMOUS VEHICLES

TECHNICAL FIELD OF THE DISCLOSURE

The present disclosure relates generally to autonomous vehicles (AVs) and, more specifically, to methods and systems for verifying certain authorized personnel to control the behavior of AVs.

BACKGROUND

Certain people are permitted to alter the flow traffic in certain situations. For example, during road construction, a road crew member may instruct vehicles to stop (e.g., if only one lane is active and is used for travel in both directions), to change lanes (e.g., to move to another side of the roadway normally used for opposite-direction travel), or to exit a roadway and take an alternate route. As another example, a police officer may direct traffic, e.g., after a car accident, or if a traffic light is out. Human drivers typically rely on various context clues (e.g., whether there is construction or an accident in the environment; the uniform and overall appearance of the person directing traffic; the time of day; etc.) to assess whether a person directing traffic is authorized to do so.

AVs may not pick up on all the context clues that human drivers do, which makes it challenging for AVs to determine whether a person directing the AV is authorized to direct the AV's movements. This can lead the AV to select the wrong maneuver, e.g., ignoring an authorized person directing the AV, or following an instruction from a person who is not authorized to direct the AV. Furthermore, as AVs are deployed, it has been observed that people tend to interfere with AVs' movements more than they would a human-driven vehicle. Mischievous actors impersonating authorized personnel may lead to increased instances of confusion for AVs.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a table illustrating example data stored in an authorized personnel hub according to some embodiments of the present disclosure.

DESCRIPTION OF EXAMPLE EMBODIMENTS OF THE DISCLOSURE

Overview

Figure 1:
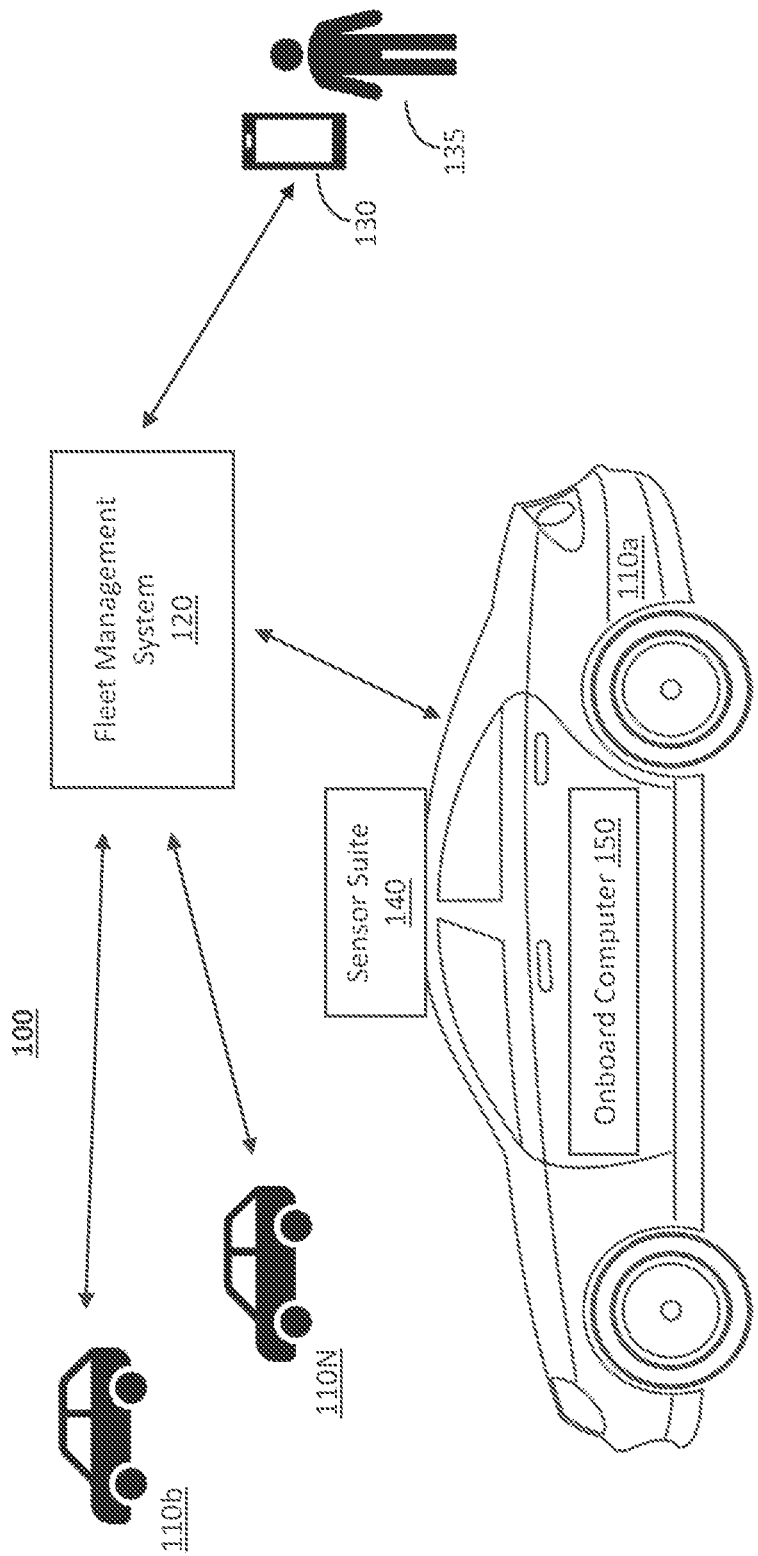
FIG. 1 is a block diagram illustrating a system including a fleet of AVs configured to verify authorized personnel to interact with the AVs, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

AVs may have difficulty determining whether people in their environments are authorized to direct behavior of the AV. As noted above, certain people are authorized by law or driving convention to direct traffic on public roadways. For example, construction workers, police officers, and crossing guards may stop or change the flow of traffic. People affiliated with the AV operator may also direct the behavior of AVs, e.g., on a public roadway or within an AV facility. However, malicious or mischievous actors who are not authorized to direct AVs may attempt to stop or redirect AVs. In some cases, the AV may have trouble distinguishing whether a person attempting to direct the AV is authorized to do so.

To verify people attempting to direct behavior the AV, authorized personnel may be assigned beacons that are detectable by one or more sensing systems of an AV. For example, a beacon may be a symbol, such as a barcode or QR code, that is worn by a person (e.g., on a vest or badge), or posted in the area of a person (e.g., on a sign near a construction site). As another example, a beacon may be an electronic device, such as a mobile phone or a Bluetooth tracker, that emits a beacon signal that can be perceived by the AV.

The AV perceives the beacon signal (e.g., an image including a visible beacon, or an electronic signal captured by a wireless receiver) and transmits the beacon signal or data describing the beacon signal to an authorization system. The authorization system accesses data associated with the beacon signal, e.g., by looking up the beacon signal in a database. The data may include one or more additional conditions for authorizing the person associated with the beacon signal. For example, the conditions may include a time of day and/or day of week for which the person associated with the beacon signal is authorized to control the AV. As another example, the conditions may include a geographic area in which a person associated with the beacon signal is authorized to control the AV. As still another example, the conditions may include additional identifying features of the person and/or the environment, e.g., features of the person's uniform. For example, if a beacon signal is posted near a construction site, construction workers in orange vests may be authorized to direct traffic around the construction site, while other workers are not authorized.

Authorized users, e.g., certain government employees or operators of an AV fleet, may provide data to the database. For example, data describing a planned construction project (e.g., location, projected date, and projected work time for the project) and beacons used by workers on the construction site may be uploaded to the database. In some embodiments, multiple databases are available for different sets of authorized users. For example, a city may maintain a database with personnel authorized by the city (e.g., police officers, city maintenance workers, etc.), and an AV operator may maintain a database with data describing authorized AV personnel (e.g., AV maintenance workers). The authorization system may check multiple databases to find the beacon signal.

Different authorized users may have different permissions levels for controlling AV behavior. As used herein, AV behavior includes any movement or non-movement of a vehicle, such as proceeding or stopping; traveling down a particular lane, road, or route; proceeding at a particular speed or range of speeds; or pulling over along a roadway, into a parking area, into a driveway, etc. Behavior may also include providing access to various areas or feature of the AV, such as allowing a person to enter a passenger or storage compartment of the AV, or allowing a person to extract data collected by the AV.

Embodiments of the present disclosure provide a method for authorizing a person interacting with an AV, the method including perceiving a person in an environment of an AV; receiving, by a sensor mounted to the AV, a beacon signal associated with the perceived person; transmitting the beacon signal to an authentication system; receiving, from the authentication system, a signal authorizing the perceived person to control behavior of the AV; and in response to receiving the signal authorizing the perceived person to control behavior of the AV, following an instruction given by the perceived person to the AV.

Embodiments of the present disclosure also provide a method for authorizing a person to interact with an AV that includes receiving, from an AV, a beacon signal perceived by the AV, the beacon signal associated with a person in an environment of the AV; retrieving, from a database, data associated with the beacon signal, the data identifying a condition for authorizing the person associated with the beacon signal to direct behavior of the AV; determining, based on the retrieved data, that the person associated with the beacon signal is authorized to direct behavior of the AV; and in response, transmitting a signal authorizing the person associated with the beacon signal to direct the AV.

Embodiments of the present disclosure also provide a system for authorizing a person interacting with an AV, the system including a sensor mounted to the AV, the sensor to perceive a beacon signal associated with a person in an environment of the AV, and an authentication system to receive the beacon signal from the AV; retrieve data associated with the beacon signal, the data identifying a condition for authorizing the person associated with the beacon signal to direct behavior of the AV; determine, based on the retrieved data, that the person associated with the beacon signal is authorized to direct behavior of the AV; and transmit a signal to the AV, the signal authorizing the person associated with the beacon signal to direct the AV.

As will be appreciated by one skilled in the art, aspects of the present disclosure, in particular aspects of verifying authorized personnel to interact with AVs, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Av Fleet System

FIG. 1 is a block diagram illustrating a system 100 including a fleet of AVs, according to some embodiments of the present disclosure. The system 100 includes a fleet of AVs 110, including AV 110a, AV 110b, and AV 110N, a fleet management system 120, and a user device 130. For example, a fleet of AVs may include a number N of AVs, e.g., AV 110a through AV 110N. AV 110a includes a sensor suite 140 and an onboard computer 150. AVs 110b through 110N also include the sensor suite 140 and the onboard computer 150. A single AV in the fleet is referred to herein as AV 110, and the fleet of AVs is referred to collectively as AVs 110.

The AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include interior and exterior cameras, radar sensors, sonar sensors, lidar (light detection and ranging) sensors, thermal sensors, GPS, wheel speed sensors, inertial measurement units (IMUS), accelerometers, microphones, strain gauges, pressure monitors, barometers, thermometers, altimeters, ambient light sensors, infrared cameras, ultraviolet light cameras, etc. The sensor suite 140 may include additional sensors for detecting wireless signals, such as a Bluetooth receiver, radio transceiver, Wi-Fi receiver, etc. The sensors may be located in various positions in and around the AV 110. For example, the AV 110 may have multiple cameras located at different positions around the exterior and/or interior of the AV 110. Certain aspects of the sensor suite 140 are described in greater detail with respect to FIG. 2.

The onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. The onboard computer 150 further detects beacon signals captured by the sensor suite 140 for verifying a person directing the AV 110, and if the person is verified, the onboard computer 150 controls behavior of the AV 110 based on instructions (e.g., gestures or signs) from the person. Verifying a person attempting to direct the AV 110 is described further in relation to FIGS. 2-7.

The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems. Certain aspects of the onboard computer 150 are described in greater detail with respect to FIG. 3.

The fleet management system 120 manages the fleet of AVs 110. The fleet management system 120 may manage one or more services that provides or uses the AVs, e.g., a service for providing rides to users using the AVs, or a service for providing deliveries to user using the AVs. The fleet management system 120 also manages fleet maintenance tasks, such as fueling, inspecting, and servicing of the AVs. The fleet management system 120 assists the AV 110 in verifying authorized personnel in the environment of the AV 110, as described further in relation to FIGS. 2-7. The AVs 110 and the fleet management system 120 may connect over a public network, such as the Internet.

The user device 130 is a personal device of the user 135, e.g., a smartphone, tablet, computer, or other device for interfacing with a user of the fleet management system 120. The user device 130 and the fleet management system 120 may connect over a public network, such as the Internet. The user device 130 may provide one or more applications (e.g., mobile device apps or browser-based apps) with which the user 135 can interface with a service that provides or uses AVs, such as a service that provides rides to users in AVs, or a service that provides deliveries to users using the AVs. The service, and particularly the AVs associated with the service, is managed by the fleet management system 120, which may also provide the application to the user device 130.

Example Sensor Suite

Figure 2:
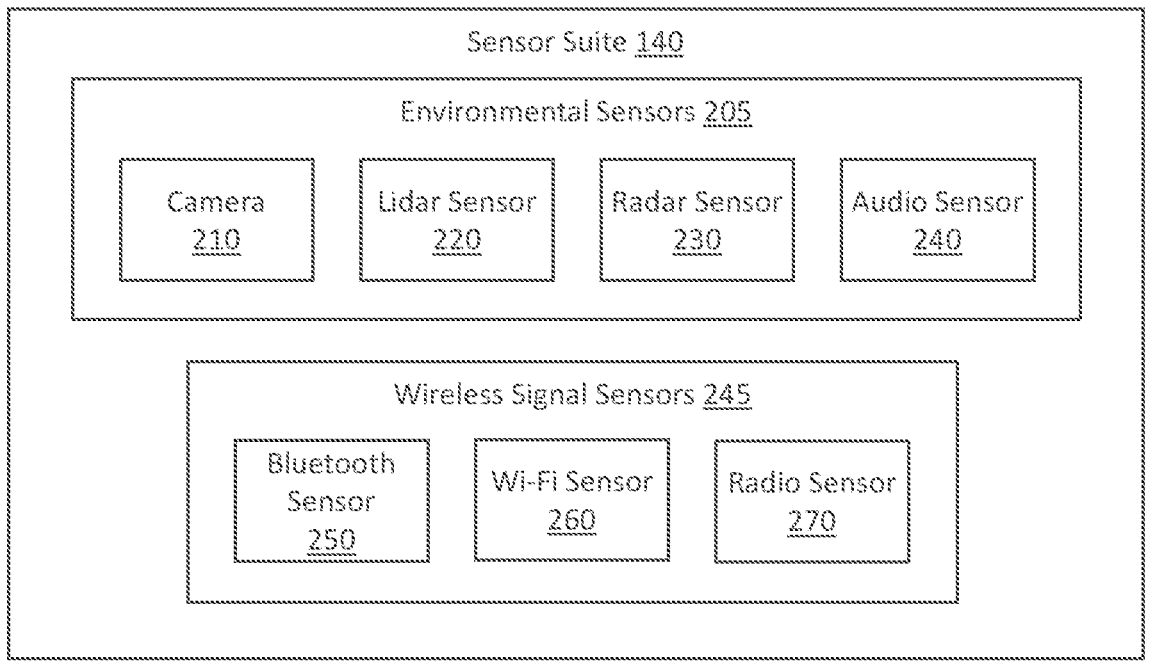
FIG. 2 is a block diagram illustrating an example sensor suite of an AV, according to some embodiments of the present disclosure.

FIG. 2 is a block diagram illustrating an example sensor suite 140 of an AV, according to some embodiments of the present disclosure. The sensor suite 140 includes a set of environmental sensors 205, e.g., a camera 210, a lidar sensors 220, a radar sensor 230, and an audio sensor 240. The sensor suite 140 further includes a set of wireless signal sensors, e.g., a Bluetooth sensor 250, a Wi-Fi sensor 260, and a radio sensor 270. Different and/or additional components may be included in the sensor suite 140. For example, the sensor suite 140 may also include photodetectors, sonar, GPS, wheel speed sensors, IMUs, accelerometers, microphones, strain gauges, pressure monitors, barometers, thermometers, altimeters, etc., as described with respect to FIG. 1. Further, while one of each of the sensors 210, 220, 230, 240, 250, 260, and 270 is shown in FIG. 2, the sensor suite 140 may include more than one of each of these components, e.g., to capture the environment around the AV 110 from different positions and angles, and for redundancy.

The environmental sensors 205 include multiple types of sensors, each of which has different attributes and advantages. Combining data from many multiple sensors and different sensor types allows the AV 110 to obtain a more complete view of its environment and allows the AV 110 to learn about its environment in different conditions, e.g., at different travel speeds, and in different lighting conditions.

For example, as shown in FIG. 2, the sensor suite 140 includes a camera 210, lidar sensor 220, radar sensor 230, and audio sensor 240.

The camera 210 captures images of the environment around the AV 110. The sensor suite 140 may include multiple cameras 210 to capture different views, e.g., a front-facing camera, a back-facing camera, and side-facing cameras. The cameras 210 may be implemented using high-resolution imagers with fixed mounting and field of view. One or more cameras 210 may capture light at different frequency ranges. For example, the sensor suite 140 may include one or more infrared cameras and/or one or more ultraviolet cameras in addition to visible light cameras.

The lidar sensor 220 measures distances to objects in the vicinity of the AV 110 using reflected laser light. The lidar sensor 220 may be a scanning lidar that provides a point-cloud of the region scanned. The lidar sensor 220 may have a fixed field of view or a dynamically configurable field of view.

The radar sensor 230 measures ranges and speeds of objects in the vicinity of the AV 110 using reflected radio waves. The radar sensor 230 may be implemented using a scanning radar with a fixed field of view or a dynamically configurable field of view. Radar sensors 230 may include articulating radar sensors, long-range radar sensors, short-range radar sensors, or some combination thereof.

In some embodiments, other types of time-of-flight sensors, such as time-of-flight cameras, infrared depth sensors, 3D scanners, structured light scanners, or other types of ranging techniques are used in addition to or instead of lidar and/or radar.

The audio sensor 240 captures sound in the vicinity of the AV 110. The audio sensor 240 may be implemented using one or more microphones that convert sound signals to digital signals. The audio sensor 240 may be configured to capture sound across a variety of frequencies, including ultrasonic waves (e.g., sound waves with a frequency above 20 kHz) or infrasonic waves (e.g., sound waves with a frequency below 20 Hz).

The data collected by the camera 210, lidar sensor 220, radar sensor 230, and audio sensor 240 is used to detect one or more objects surrounding the AV 110. For example, the sensor suite 140 produces a data set that can be used by the onboard computer 150 to detect other cars, pedestrians, trees, bicycles, objects within a road on which the AV 110 is traveling (such as construction equipment and/or other objects that may impede movement of the vehicle), and indications surrounding the AV 110 (such as construction signs, stop indicators, and other street signs). The data set collected by the environmental sensors 205 can be used to first identify people in the area of the AV 110, and then to determine whether any of the identified people are attempting to control behavior of the AV 110.

The environmental sensors 205 and/or wireless signal sensors 245 can also be used to detect a beacon signal associated with a person that is authorized to control behavior of the AV 110. In some embodiments, a beacon signal is a visual symbol (e.g., a barcode, a QR code, a set of printed characters, or another visual symbol) captured by the camera 210. In some embodiments, a beacon signal may be displayed in a non-visible band of light, e.g., ultraviolet (UV) light or infrared (IR), and the camera 210 is a UV or IR camera for capturing the frequency of the beacon signal. In some embodiments, the beacon signal is an audio signal captured by the audio sensor 240. The audio signal may be outside a normal range of human hearing (e.g., an audio beacon signal may be ultrasonic or infrasonic).

In some embodiments, the beacon signal is a wireless signal transmitted by a beacon device and captured by one of the wireless signal sensors 245. The beacon device may be a dedicated beacon device assigned to a person or group of people to identify them to the AV fleet. Alternatively, the beacon device may be a multi-purpose electronic device, such as a cell phone or other mobile device, that is configured to transmit a beacon signal to the AV 110. The beacon device may be configured to transmit the beacon signal over any wireless protocol, such as Bluetooth, Wi-Fi, or radio. Accordingly, the wireless signal sensors 245 may include a Bluetooth sensor 250, Wi-Fi sensor 260, and/or radio sensor 270 to receive a Bluetooth, Wi-Fi, or radio wave beacon signal, respectively. In some embodiments, the wireless signal sensors 245 may include multiple sensors to receive beacon signals from different types of beacon devices.

The beacon signals and sensors for detecting beacon signals described herein are provided as examples. A beacon signal can include any type of signal that can be transmitted from a beacon device and received by one or more sensors of the AV 110, or any type of passive signal that can observed by the AV 110. The sensor suite 140 of the AV 110 may be adapted to detect various types of beacon signals, including beacon signals not specifically described herein.

Example Onboard Computer

Figure 3:
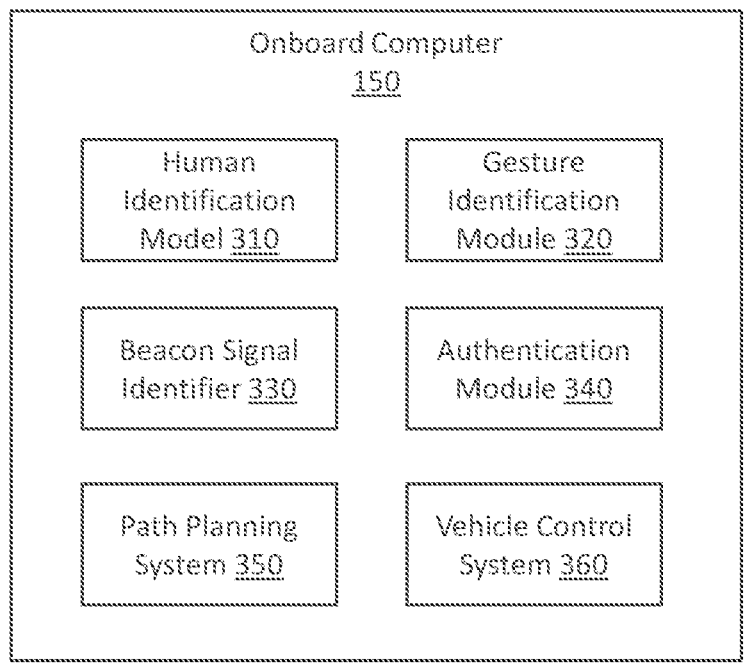
FIG. 3 is a block diagram illustrating an example onboard computer of an AV, according to some embodiments of the present disclosure.

FIG. 3 is a block diagram illustrating an example onboard computer of an AV, according to some embodiments of the present disclosure. The onboard computer 150 includes a human identification model 310, a gesture identification module 320, a beacon signal identifier 330, an authentication module 340, a path planning system 350, and a vehicle control system 360. In alternative configurations, fewer, different and/or additional components may be included in the onboard computer 150. Further, functionality attributed to one component of the onboard computer 150 may be accomplished by a different component included in the onboard computer 150 or a different system than those illustrated.

The human identification model 310 identifies humans in the environment of the AV 110. The human identification model 310 receives sensor data describing the environment surrounding the AV 110. The sensor data is collected by the sensor suite 140, described with respect to FIG. 2. The sensor data used by the human identification model 310 may include data from a subset of sensors in the sensor suite 140, e.g., data from one or more cameras 210, or data from a camera 210 and the lidar sensor 220. The human identification model 310 may be trained based on a training data set gathered by one or more AVs with similar sensor suites to the sensor suite 140. The training data may be labeled to indicate whether the training data includes humans, and the locations of the humans, and a machine-learned model may be trained from the training data to detect humans in sensor data gathered in real-time by the sensor suite 140. The human identification model 310 may identify multiple humans in the environment of the AV 110 and determine a number of the identified humans.

The gesture identification module 320 identifies control gestures made by humans in the environment of the AV 110. As used herein, a control gesture is a gesture made by a person to direct movement or other behavior of the AV 110, such as an instruction to stop, go, change lanes, turn, pull over, etc. In some examples, the control gesture may include signage provided by the human, e.g., a construction worker holding a "stop" or "slow" sign. A control gesture may be static or may include motion (e.g., a person instructing a vehicle to proceed by circling his arm). The gesture identification module 320 may include a model trained based on sensor observations of a plurality of humans performing one or more control gestures, e.g., a training data set gathered by one or more AVs with similar sensor suites to the sensor suite 140. The training data may be labeled to indicate whether each observed human is performing a gesture, and what gesture the human is performing. To obtain the training data, AVs 110 may observe various types of personnel authorized to direct traffic, e.g., construction workers, police officers, crossing guards, etc. This way, the gesture identification model is trained to recognize a variety of gesture types provided by a variety of people.

The beacon signal identifier 330 identifies a beacon signal associated with a person performing a control gesture. The beacon signal identifier 330 processes data obtained by the sensor suite 140 to identify a beacon signal. The beacon signal identifier 330 may output the beacon signal itself, e.g., a digital signal transmitted wirelessly from a beacon device to the AV 110. In some embodiments, the beacon signal identifier 330 outputs other data describing the beacon signal, e.g., data extracted from a QR code captured by a camera 210, or a digital representation of an audio beacon signal captured by an audio sensor 240. For convenience, both a beacon signal itself, and data describing or derived from the beacon signal and used by the onboard computer 150 and/or fleet management system 120 to verify authorized personnel, are generally referred to herein as a "beacon signal."

The beacon signal identifier 330 may determine a source location of the beacon signal, e.g., based on a location of a visible beacon signal, or based on a direction of an electronic beacon device relative to the AV 110. In some embodiments, the beacon signal identifier 330 searches the data obtained by the sensor suite 140 in response to the gesture identification module 320 detecting a person making a control gesture in the environment of the AV 110. In some embodiments, the beacon signal identifier 330 may identify beacon signals in a separate process, possibly before a control gesture is detected. In some cases, the beacon signal identifier 330 may identify certain types of beacon signals, e.g., wireless beacon signals, regardless of whether a control gesture is identified, while the beacon signal identifier 330 may search for other types of beacon signals (e.g., a visible QR code worn by a person determined to be making a control gesture) after the gesture identification module 320 has identified the person making the control gesture.

The authentication module 340 verifies whether the person making the control gesture is authorized to control the AV 110 based on the beacon signal. The authentication module 340 receives a beacon signal from the beacon signal identifier 330. The authentication module 340 interfaces with the fleet management system 120 to verify the person making the control gesture. In particular, the authentication module 340 transmits the beacon signal to an authentication system of the fleet management system 120, which verifies the beacon signal and may look up one or more conditions associated with the beacon signal. This process is described further with respect to FIG. 5. The authentication module 340 receives an authorization signal from the fleet management system 120 and determines, based on the authorization signal, whether to allow the person making the control gesture to control the AV 110. The authorization signal may include one or more conditions for the authentication module 340 to check before allowing the person making the control gesture to control the AV 110. Example conditions checked by the authentication module 340 are described with respect to FIG. 6.

The path planning system 350 plans a path for the AV 110 based on data received from the sensor suite 140. The path planning system 350 may receive navigation information, e.g., a description of a planned route, or the address of a destination, and use this information to plan the path. The path planning system 350 further incorporates data describing real-time environmental data perceived by the sensor suite 140, including the location of other vehicles, traffic control signals and signs, pedestrians, bicycles, etc., to plan the path. The path planning system 350 determines a planned pathway for the AV 110 to follow by applying path planning rules or models to the environmental data. When objects are present in the environment of the AV 110, the path planning system 350 determines the planned pathway for the AV 110 based on predicted pathways of the objects and right-of-way rules that regulate behavior of vehicles, bicycles, pedestrians, or other objects.

The path planning system 350 may alter a planned path based on a control gesture detected by the gesture identification module 320. The path planning system 350 may select a path based on whether or not the person making the control gesture is authorized to control behavior of the AV 110, as determined by the authentication module 340. In some cases, even if a person is not authorized to control the AV 110, the behavior of the person still alters the path of the AV 110. For example, if the AV 110 recognizes that other vehicles are following instructions from the unauthorized person, the AV 110 may opt to follow the instructions so that traffic continues to flow smoothly. As another example, if an unauthorized person is standing in the middle of the roadway and instructs an AV 110 to stop, the AV 110 cannot proceed through the roadway. However, if a second lane is clear, and the AV 110 observes that the roadway behind the person is also clear, the AV 110 may change to the second lane and proceed along the road. On the other hand, if the person is authorized to control behavior of the AV 110, the AV 110 stops until the person gestures to the AV 110 that the AV 110 may proceed.

While following instructions from an authorized person, the environmental sensors 205 continue to observe the environment of the AV 110, and the path planning system 350 determines the path based on both the instruction identified by the gesture identification module 320 and the environment of the AV 110. For example, if an authorized police officer instructs the AV 110 to proceed through an intersection, but another vehicle is stopped in front of the AV 110, the AV 110 waits for the vehicle in front of it to proceed first to avoid a collision with the stopped vehicle. In some cases, the path planning system 350 may allow the authorized person to override other environmental factors detected by the sensor suite 140. For example, if the AV 110 approaches a red traffic light, but a police officer authorized to control the AV 110 is instructing the AV 110 to proceed through the intersection, and the AV 110 observes that cross-traffic is stopped, the AV 110 proceeds through the intersection according to the officer's instruction despite the red traffic signal.

The vehicle control system 360 instructs the movement-related subsystems of the AV 110 to maneuver according to the planned pathway provided by the path planning system 350. The vehicle control system 360 may include the throttle interface for controlling the engine throttle, motor speed (e.g., rotational speed of electric motor), or any other movement-enabling mechanism; the brake interface for controlling the brakes of the AV 110 (or any other movement-retarding mechanism); and the steering interface for controlling steering of the AV 110 (e.g., by changing the angle of wheels of the AV).

Example Person with Beacon Signal Controlling Behavior of the Av

Figure 4:
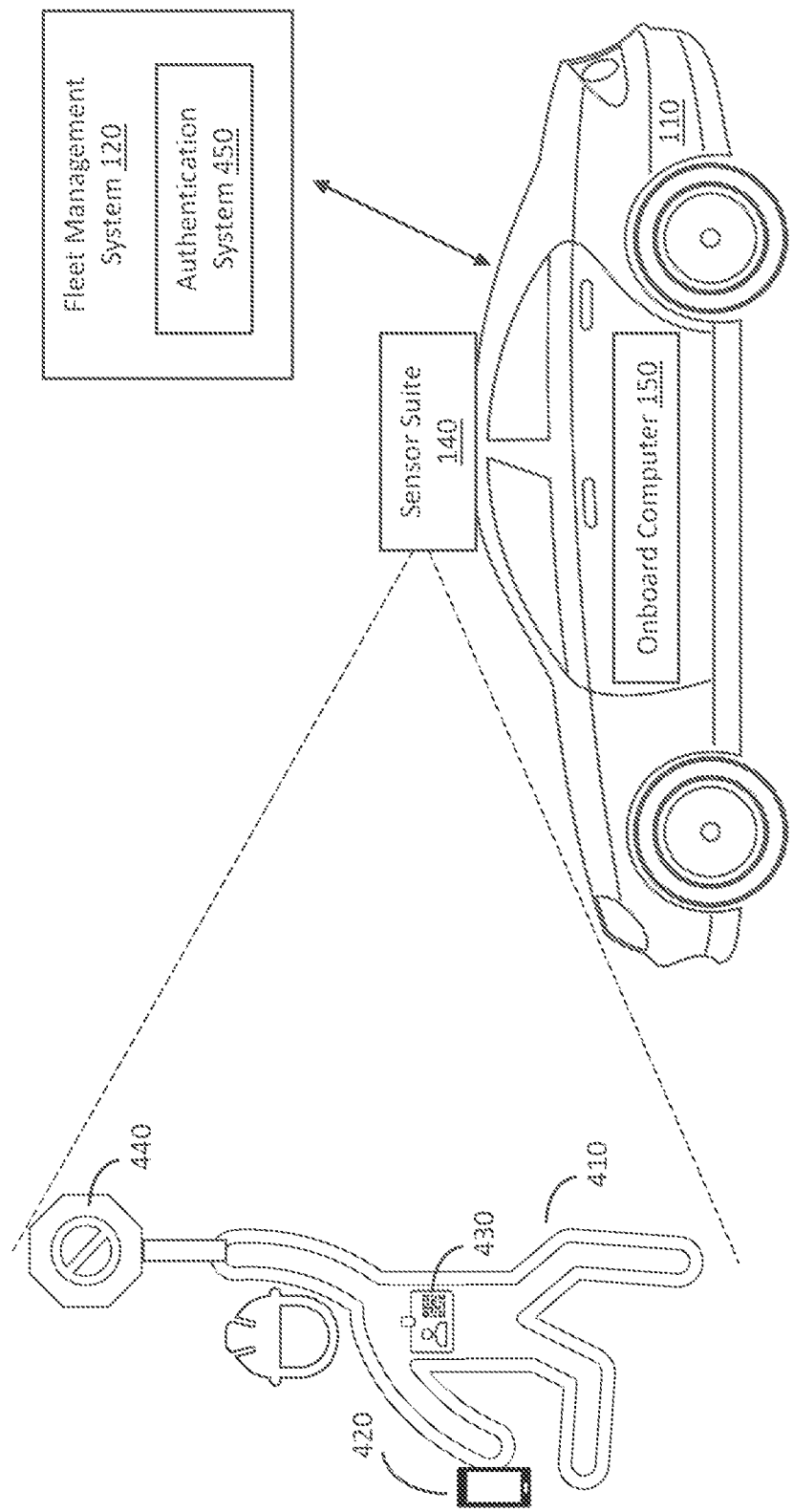
FIG. 4 illustrates an example AV detecting a person attempting to direct the AV according to some embodiments of the present disclosure.

FIG. 4 illustrates an example AV 110 detecting a person 410 attempting to direct behavior of the AV according to some embodiments of the present disclosure. The sensor suite 140 captures images and/or other data describing the person 410. Two example beacons are shown in FIG. 4. First, the person 410 holds a mobile device 420 that may be configured to emit a wireless beacon signal, such as any of the wireless beacon signals described with respect to FIG. 2. The mobile device 420 may transmit the beacon signal in response to receiving a request transmitted by the AV 110. Second, the person is wearing a badge that includes a visible QR code 430. The QR code 430 may encode a beacon signal that is captured by camera 210 of the sensor suite 140. In this example, two types of beacon signals are shown; in other embodiments, the person 410 may either have a beacon signal on the mobile device 420 or the QR code 430 beacon signal but not both, or a different beacon signal may be used. The beacon signal identifier 330 of the onboard computer 150 identifies the beacon signal(s), such as the QR code 430 and the wireless beacon signal from the mobile device 420.

In addition to identifying the beacon signal, the onboard computer 150 (e.g., the gesture identification module 320) determines that the person 410 is making a gesture to control behavior of the AV 110. In this example, the gesture includes the person 410 holding up a sign 440 in the direction of the AV 110. The sign 440 instructs the AV 110 to stop. For example, the person 410 is a construction worker controlling two-way traffic along a single lane.

In response to detecting the beacon signal(s), and optionally, in response to determining that the person 410 is attempting to direct behavior of the AV 110, the AV 110 transmits the beacon signal(s) to the fleet management system 120. In this example, the fleet management system 120 includes an authentication system 450 that verifies the person 410 associated with the beacon signal(s). The authentication procedure performed by the authentication system 450 is described further in relation to FIGS. 5-7. If the authentication system 450 verifies the person 410 based on the beacon signal(s), the authentication system 450 transmits an authorization signal to the AV 110. In response to receiving the authorization signal, the AV 110 follows instructions from the person 410 controlling behavior of the AV 110, e.g., based on gestures made by the person 410 and detected by the gesture identification module 320. In this example, the AV 110 stops until the person 410 gestures that the AV 110 can proceed, e.g., by flipping the sign 440 from a "stop" side to a "proceed" or "slow" side.

Example System for Verifying Authorized Personnel

Figure 5:
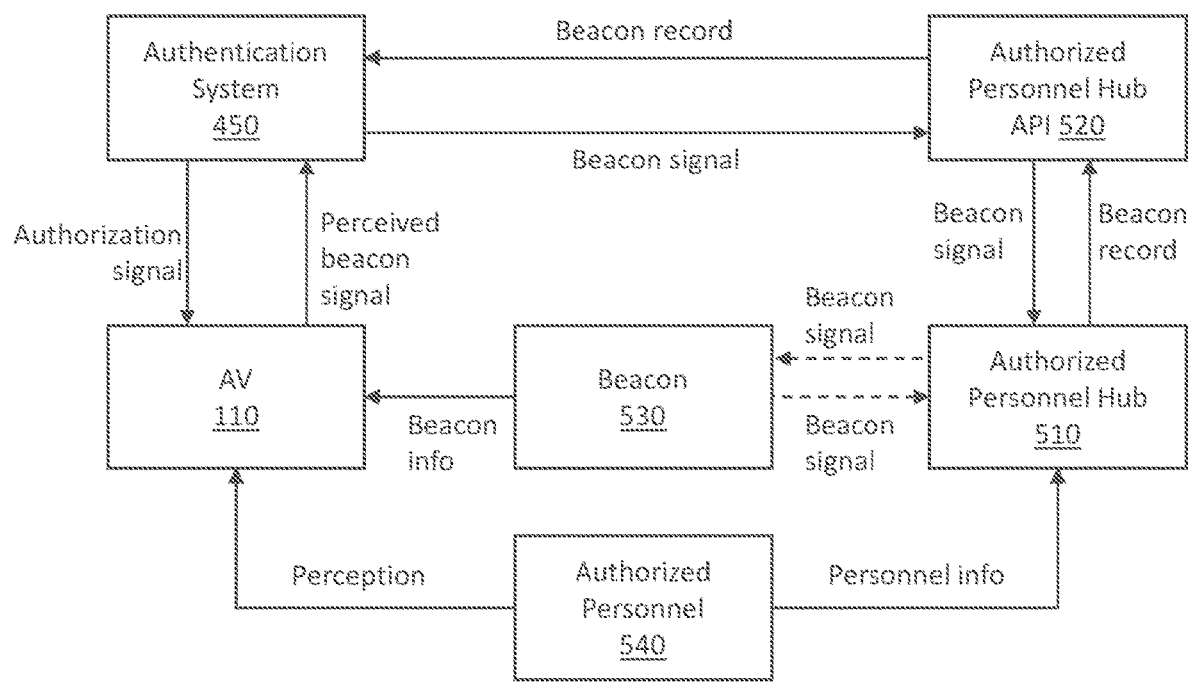
FIG. 5 is a block diagram showing a system for verifying that a person is authorized to control behavior of the AV and showing data flow within the system according to some embodiments of the present disclosure.

FIG. 5 is a block diagram showing a system for verifying that a person is authorized to control behavior of the AV and showing data flow within the system according to some embodiments of the present disclosure. The system includes the AV 110, which includes the sensor suite 140 and onboard computer 150 as described with respect to FIGS. 1-3. The AV 110 is in communication with the authentication system 450, which may be a subsystem of the fleet management system 120 (as shown in FIG. 4), or a separate system accessed by the AV 110 directly or by the fleet management system 120. As discussed with respect to FIG. 4, the AV 110 transmits the perceived beacon signal to the authentication system 450, and if the authentication system 450 verifies the beacon signal, the authentication system 450 transmits an authorization signal to the AV 110. As noted with respect to FIG. 3, the beacon signal transmitted from the AV 110 to the authentication system 450 and used within the rest of the system shown in FIG. 5 may be data describing or derived from the beacon signal observed at the AV 110, e.g., a digital representation of a visual signal or audio signal.

To verify a received beacon signal, the authentication system 450 may access a database that stores beacon signals associated with data describing authorized personnel associated with the beacon signals. The authorized personnel hub 510 is an example of a database relating beacon signals to authorized personnel. In this example, the authentication system 450 accesses the authorized personnel hub 510 via an authorized personnel hub application programming interface (API) 520. The authorized personnel hub API 520 provides an interface via which the authentication system 450 can transmit the beacon signal and receive a beacon record from the authorized personnel hub 510. More specifically, the authorized personnel hub API 520 looks up the beacon signal in the authorized personnel hub 510, retrieves the beacon record from the authorized personnel hub 510, and returns the beacon record to the authentication system 450.

A beacon record in the authorized personnel hub 510 may include one or more conditions for authorizing a person to direct behavior of the AV 110. Example conditions include days and/or times that a person associated with the beacon is authorized to direct AV behaviors, a geographic area in which the person associated with the beacon is authorized to direct AV behaviors, additional information for identifying or verifying the person associated with the beacon signal (e.g., visual characteristics of the person or environment), and permitted controls for the person associated with the beacon signal (e.g., whether the person can cause the AV 110 to pull over or change routes). Some conditions may be checked by the authentication system 450 when determining whether to send the authorization signal, e.g., the authentication system 450 may check the current time and day against the beacon record, or the authentication system 450 may access a current location of the AV 110 and compare the AV's location to the geographic area indicated by the beacon record. Some conditions may be transmitted in the authorization signal from the authentication system 450 to the AV 110, e.g., a visual characteristic for the AV 110 to compare to sensor data (e.g., visual data from the camera 210) before allowing the person to direct behavior of the AV 110. This is indicated in FIG. 5 as the perception of the authorized personnel 540 by the AV 110. An example of three beacon records stored in the authorized personnel hub 510 are shown in FIG. 6.

The authorized personnel hub 510 may be populated by various parties, e.g., the authorized personnel themselves, administrators associated with authorized personnel, and/or administrators at the fleet management system 120. FIG. 5 shows personnel info provided from authorized personnel 540 to the authorized personnel hub 510. For example, an authorized person may upload a portrait photograph to the authorized personnel hub 510 that the authorized personnel hub 510 associates with the beacon record for that person. When the beacon is detected by the AV 110, the authorized personnel hub 510 transmits the photograph to the AV 110 (via the authorized personnel hub API 520 and the authentication system 450, as discussed above), and the AV 110 compares the photograph to a real-time image of a person in the AV's environment to confirm that the beacon signal matches the person associated with the beacon signal. As another example, authorized personnel 540 may update the authorized personnel hub 510 based on their current assignments, e.g., a construction company updates the authorized personnel hub 510 with details (locations, work times, expected routing changes) for new construction projects, or a police administrator updates the authorized personnel hub 510 with known traffic changes or stops.

In some embodiments, the authorized personnel hub API 520 and authorized personnel hub 510 are part of the fleet management system 120. In other embodiments, the authorized personnel hub API 520 and/or authorized personnel hub 510 are separate services accessed by the fleet management system 120. While one authorized personnel hub 510 is shown in FIG. 5, in other embodiments, multiple databases for different groups of personnel are accessed by the authentication system 450, by the authorized personnel hub API 520 or by multiple different APIs. For example, a local government may administer a database describing beacons associated with government employees (e.g., police officers) and/or with private people or groups registered with the government (e.g., contractors for road construction projects), and the fleet operator may administer a separate database describing beacons associated with fleet employees.

As noted above, in some embodiments, the beacon 530 is an electronic device that transmits a wireless beacon signal to the AV 110. In some embodiments, the beacon device is a dynamic device that changes its beacon signal over time. For example, the beacon 530 may receive a request from the AV 110 for a beacon signal, and in response, the beacon 530 generates a new beacon signal and informs the authorized personnel hub 510. Alternatively, in response to a request from the AV 110, the beacon 530 requests an updated beacon signal from the authorized personnel hub 510, and the authorized personnel hub 510 transmits the updated beacon signal to the beacon 530 and updates the database. In another example, the beacon 530 or the authorized personnel hub 510 may update a beacon signal periodically, e.g., every day, every hour, or every minute. In some cases, the beacon signal may update according to a predetermined pattern known to both the beacon 530 and the authorized personnel hub 510, and the beacon 530 does not need to update the authorized personnel hub 510 that the beacon signal has updated, or vice versa.

While the beacon signals have been discussed in the context of a person controlling AV behaviors, e.g., with gestures or signs, in some embodiments, a control gesture or control sign associated with a beacon signal is not provided by a human. For example, a control sign providing instructions to vehicles may be posted along a roadway, e.g., a construction crew may set up a sign that instructs the AV 110 to change lanes or follow a posted detour. The sign may include or may be associated with a beacon signal that can be used by the AV 110 as described herein to verify the sign. For example, a sign may include a QR code that the AV 110 and authentication system 450 can use to verify the sign and determine whether the AV 110 should follow the sign as instructed.

Example Beacon Records

FIG. 6 is a table illustrating example data stored in an authorized personnel hub according to some embodiments of the present disclosure. The table includes three beacon records associated with three authorized people or groups of authorized people (e.g., a group of people working at a construction site associated with a posted beacon sign). Each beacon record includes a beacon type, e.g., a QR code on a posted sign, a personal QR code, or an electronic beacon device. For the first beacon record of the construction crew, the beacon type is a dynamic QR code, e.g., the sign is an electronic sign that displays a QR code that updates periodically or based on requests from AVs (as discussed with respect to FIG. 5). For the second beacon record associated with a crossing guard, the beacon type is a static QR code, e.g., a QR code printed on a badge assigned to the crossing guard. For the third beacon record, the beacon type is a Bluetooth beacon device, e.g., a dedicated beacon device assigned to the fleet employee, or a mobile phone associated with the fleet employee that emits a Bluetooth beacon signal.

The beacon records include an active time period, e.g., a time of day and/or day of week during which AVs 110 should follow instructions associated with a beacon signal. In this example, for the third beacon record of a fleet employee (e.g., a person working for the fleet operator), the beacon is active at any time; the other two beacons are limited to certain days and times. The authentication system 450 or the AV 110 may compare the current time to the active time period in the beacon record to determine whether to verify the person associated with the beacon signal. The beacon records also include a location in which the beacon is active. In this example, the fleet employee's beacon is active at any location, but in other cases, the fleet employee's beacon may be active within a fleet management facility or other limited geographic area. The locations provided in the record may be translated into different geographic systems, e.g., latitude/longitudes, or other ways of identifying locations within a map used by the fleet management system. The authentication system 450 or the AV 110 may compare the current location of the AV 110 and/or the person gesturing to the AV 110 to the location in the beacon record to determine whether to verify the person associated with the beacon signal.

The beacon records further include other identifiers, e.g., visual characteristics of the authorized personnel or of the expected environment of the authorized personnel. The first beacon record for the construction crew specifies that a crew member that can control the AV 110 is wearing an orange vest. In some cases, a construction company may use vest colors or other features to distinguish certain crew members that can control AVs 110. For example, the crew members that are directing traffic wear orange vests, while other crew members operating machinery or performing other tasks wear yellow vests. This can help the AV 110 identify the correct person to observe for instructions in a large crew, and avoid confusion if other crew members are gesturing to each other. The second beacon record for the crossing guard specifies that the crossing guard is wearing a yellow vest and that children are in the area. In this example, the AV 110 may check the environment to confirm that children are in the area before following the instructions of the crossing guard. However, if the crossing guard is blocking the path of the AV 110 despite no children being in the environment, the AV 110 still waits for the crossing guard to clear the path before the AV 110 proceeds. The third beacon record for the fleet employee includes facial recognition information (e.g., an employee badge photograph) that the AV 110 or authentication system 450 compares to an image or images of the fleet employee captured by a camera 210 of the AV 110. The AV 110 or authentication system 450 verifies the fleet employee in response to the face of the fleet employee matching the employee badge.

The beacon records also include permissions for the authorized personnel. The permissions indicate what type of actions the authorized personnel are authorized to instruct the AV 110 to perform. In this example, all of the beacon records include instructing an AV to stop and go along a roadway. The construction crew is further permitted to instruct an AV to change lane along a planned roadway (e.g., to a different lane along the roadway the path planning system 350 planned to drive along), and to redirect the AV 110 to another known roadway (e.g., to direct the AV 110 to follow a detour along public roads). The fleet employee has additional permissions, including instructing the AV to pull over, entering the AV, and accessing computer systems of the AV. The AV 110 compares an instruction associated with a gesture identified by the gesture identification module 320 to the permissions to determine whether to follow the instruction associated with the gesture. For example, if the crossing guard in the second beacon record instructs the AV 110 to pull over, the AV 110 determines that the crossing guard does not have permission to instruct the AV 110 to pull over and may ignore the instruction.

Example Method for Authorizing a Person to Control Av Behavior

Figure 7:
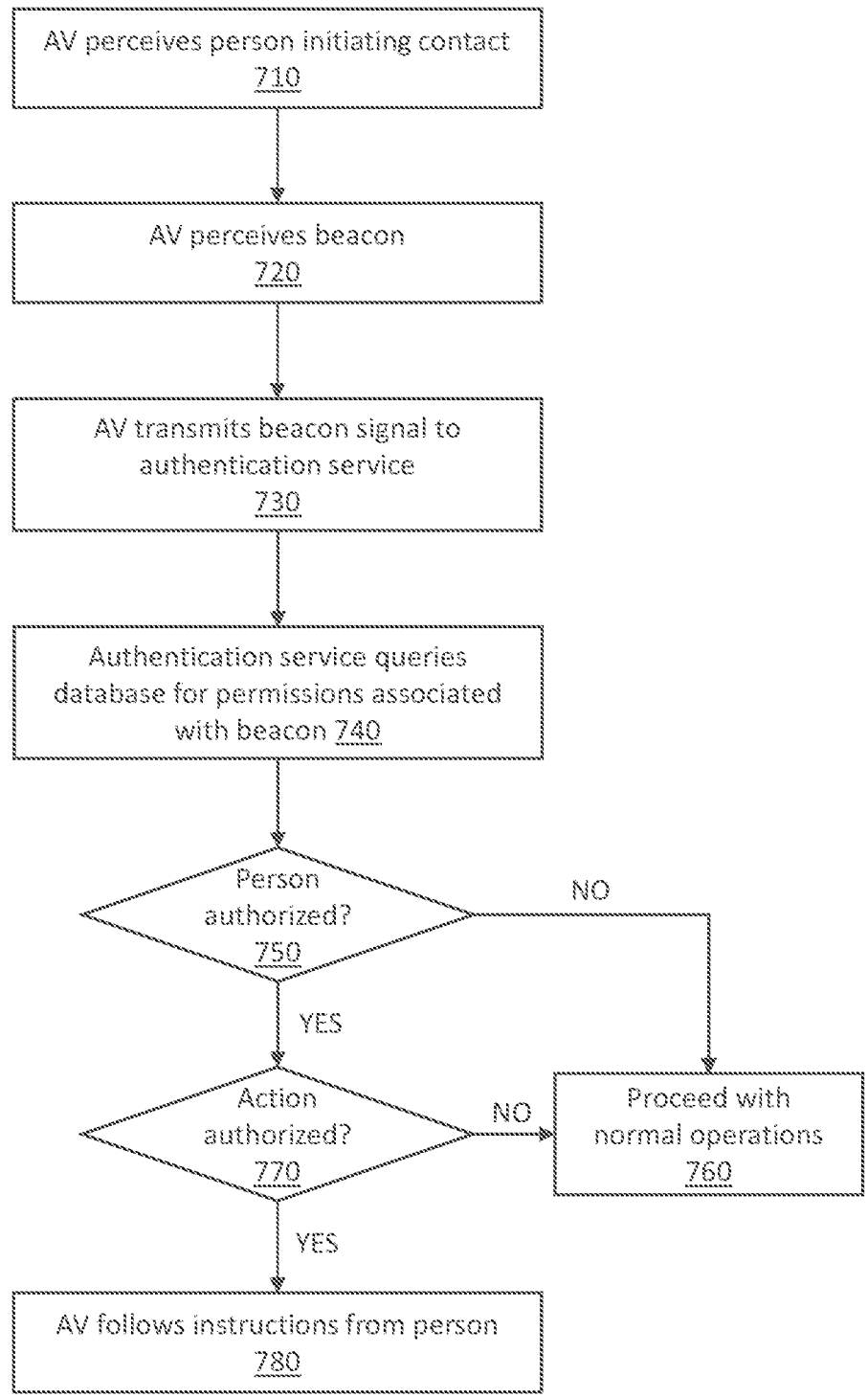
FIG. 7 is a flowchart of an example method for authorizing a person to control behavior of an AV according to some embodiments of the present disclosure.

FIG. 7 is a flowchart of an example method for authorizing a person to control behavior of an AV according to some embodiments of the present disclosure. The AV 110 perceives 710 a person initiating contact with the AV 110. For example, the human identification model 310 identifies a person in the environment of the AV 110 based on data from the environmental sensors 205, and the gesture identification module 320 determines a control gesture made by the perceived person. The AV 110 further perceives a beacon in its environment. For example, the beacon signal identifier 330 identifies a beacon signal based on data received from a camera 210, a wireless signal sensors 245, or another AV sensor. In some embodiments, steps 710 and 720 may be performed in the opposite order or in parallel.

The AV 110 transmits 730 the perceived beacon signal to an authentication system, e.g., the authentication system 450. The authentication system 450 queries a database for permissions associated with the beacon 740. For example, the authentication system 450 queries the authorized personnel hub 510 for the beacon record associated with the beacon signal, as described with respect to FIG. 5. The authentication system 450 determines 750 whether the perceived person is authorized to control behavior of the AV 110 based on the beacon record retrieved from the database. For example, the authentication system 450 may check various conditions required for permission, as described above. In some embodiments, the AV 110 assists in determining whether the person is authorized, e.g., by comparing conditions in the beacon record to visual characteristics of the perceived person or the AV's environment.

If the person is not authorized, the AV 110 ignores the person and proceeds 760 with its normal operations, e.g., the path planning system 350 instructs the vehicle control system 360 to proceed with a planned path that does not account for the instruction from the person. As noted above, in some situations (e.g., if the person is blocking the path of the AV 110, or other cars in the environment of the AV 110 are following instructions from the person), the AV 110 may follow the instructions of the person even if the person is not authorized.

If the person is authorized, the AV 110 determines 770 whether the action that the person instructing the AV 110 to perform is authorized for that person. For example, the AV 110 compares a gesture-based instruction to the permissions in the beacon record and determines whether the instruction corresponds to a permitted instruction. If the action is not authorized (e.g., if the crossing guard with the second beacon record in FIG. 6 instructs the AV 110 to pull over), the AV 110 proceeds 760 with its normal operations. If the action is authorized, the AV 110 follows 780 the instructions from the person.

Select Examples

Example 1 provides method for authorizing a person interacting with an AV, the method including perceiving a person in an environment of an AV; receiving, by a sensor mounted to the AV, a beacon signal associated with the perceived person; transmitting the beacon signal to an authentication system; receiving, from the authentication system, a signal authorizing the perceived person to control behavior of the AV; and in response to receiving the signal authorizing the perceived person to control behavior of the AV, following an instruction given by the perceived person to the AV.

Example 2 provides the method according to example 1, where the signal authorizing the perceived person to control behavior of the AV includes a visual identifier associated with the perceived person, and the method further includes sensing, by the AV, a visual characteristic of the perceived person; determining that the visual characteristic matches the visual identifier; and following the instruction given by the perceived person further in response to determining that the visual characteristic matches the visual identifier.

Example 3 provides the method according to example 1, the signal authorizing the perceived person to control behavior of the AV includes a visual identifier in the environment of the perceived person, and the method further includes sensing, by the AV, a visual characteristic of the environment of the perceived person; determining that the visual characteristic matches the visual identifier; and following the instruction given by the perceived person further in response to determining that the visual characteristic matches the visual identifier.

Example 4 provides the method according to example 1, where the signal authorizing the perceived person to control behavior of the AV includes a type of permitted control, and the method further includes comparing the instruction given by the perceived person to the type of permitted control; and following the instruction given by the perceived person further in response to determining that the instruction matches the type of permitted control.

Example 5 provides the method according to example 1, where the beacon signal is associated with a geographic region, and the perceived person associated with the beacon signal is a person within the geographic region.

Example 6 provides the method according to example 1, where the beacon signal is a wireless signal output by an electronic device, and AV is further configured to transmit a request to the electronic device to transmit the beacon signal to the AV.

Example 7 provides the method according to example 1, where the beacon signal is a visual symbol, and the sensor mounted to the AV is a camera to capture an image of the visual symbol.

Example 8 provides a method for authorizing a person to interact with an AV, the method including receiving, from an AV, a beacon signal perceived by the AV, the beacon signal associated with a person in an environment of the AV; retrieving, from a database, data associated with the beacon signal, the data identifying a condition for authorizing the person associated with the beacon signal to direct behavior of the AV; determining, based on the retrieved data, that the person associated with the beacon signal is authorized to direct behavior of the AV; and in response, transmitting a signal authorizing the person associated with the beacon signal to direct the AV.

Example 9 provides the method according to example 8, where the condition is a time period, and the method further includes determining that a current time is within the time period.

Example 10 provides the method according to example 8, where the condition is a geographic area, and the method further includes receiving, from the AV, a location of the person associated with the beacon signal; and determining that the location of the person associated with the beacon signal matches the geographic area.

Example 11 provides the method according to example 8, where the condition is an expected visual characteristic of the person associated with the beacon signal, and the method further includes receiving, from the AV, data describing a visual characteristic of the person in the environment of the AV; and determining that the expected visual characteristic of the person associated with the beacon signal matches the visual characteristic of the person in the environment of the AV.

Example 12 provides the method according to example 8, where the signal authorizing the person associated with the beacon signal to direct the AV includes a second condition, where the AV authorizes the person associated with the beacon signal to direct the AV in response to the second condition being met.

Example 13 provides the method according to example 8, where the database includes data describing a plurality of authorized personnel, each authorized personnel associated with a respective beacon signal, and at least a portion of the authorized personnel associated with one or more conditions for authorizing the authorized personnel to direct behavior of the AV.

Example 14 provides the method according to example 8, further including receiving, from a device generating the beacon signal, a request for an updated beacon signal; and transmitting the updated beacon signal to the device; where the beacon signal perceived by the AV is the updated beacon signal.

Example 15 provides a system for authorizing a person interacting with an AV, the system including a sensor mounted to the AV, the sensor to perceive a beacon signal associated with a person in an environment of the AV, and an authentication system to receive the beacon signal from the AV; retrieve data associated with the beacon signal, the data identifying a condition for authorizing the person associated with the beacon signal to direct behavior of the AV; determine, based on the retrieved data, that the person associated with the beacon signal is authorized to direct behavior of the AV; and transmit a signal to the AV, the signal authorizing the person associated with the beacon signal to direct the AV.

Example 16 provides the system according to example 15, further including a database that has data describing a plurality of authorized personnel, each authorized personnel associated with a respective beacon signal, and at least a portion of the authorized personnel associated with one or more conditions for authorizing the authorized personnel to direct behavior of the AV.

Example 17 provides the system according to example 16, further including an API by the authentication system to access the database.

Example 18 provides the system according to example 16, where a first condition for authorizing the authorized personnel to direct behavior of the AV is a time of day, and a second condition for authorizing the authorized personnel to direct behavior of the AV is a geographic area.

Example 19 provides the system according to example 15, further including a beacon device for transmitting the beacon signal, the beacon device assigned to the person in the environment of the AV.

Example 20 provides the system according to example 19, where the beacon device is a dynamic beacon device that transmits an updated beacon signal in response to a query from the AV.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
   perceiving a person in an environment of an autonomous vehicle (AV);
   determining that the perceived person is making a control gesture directed to the AV;
   receiving, by a sensor mounted to the AV, a beacon signal associated with the perceived person;
   in response to determining that the perceived person is making the control gesture, determining that the perceived person is associated with the received beacon signal;
   in response to determining that the perceived person is associated with the received beacon signal, transmitting the beacon signal to an authentication system;
   receiving, from the authentication system, a signal authorizing the perceived person associated with the beacon signal to control behavior of the AV; and
   in response to receiving the signal authorizing the perceived person to control behavior of the AV, following the control gesture made by the perceived person directed to the AV.

2. The method of claim 1, the signal authorizing the perceived person to control behavior of the AV comprises a visual identifier associated with the perceived person, and the method further comprises:
   sensing, by the AV, a visual characteristic of the perceived person;
   determining that the visual characteristic matches the visual identifier; and
   following the control gesture given by the perceived person further in response to determining that the visual characteristic matches the visual identifier.

3. The method of claim 1, the signal authorizing the perceived person to control behavior of the AV comprises a visual identifier in the environment of the perceived person, and the method further comprises:
   sensing, by the AV, a visual characteristic of the environment of the perceived person;
   determining that the visual characteristic matches the visual identifier; and
   following the control gesture given by the perceived person further in response to determining that the visual characteristic matches the visual identifier.

4. The method of claim 1, wherein the signal authorizing the perceived person to control behavior of the AV comprises a type of permitted control, and the method further comprises:
   comparing the control gesture given by the perceived person to the type of permitted control; and
   following the control gesture given by the perceived person further in response to determining that the control gesture matches the type of permitted control.

5. The method of claim 1, wherein the beacon signal is associated with a geographic region, and the perceived person associated with the beacon signal is within the geographic region.

6. The method of claim 1, wherein the beacon signal is a wireless signal output by an electronic device, and the AV is further configured to transmit a request to the electronic device to transmit the beacon signal to the AV.

7. The method of claim 1, wherein the beacon signal comprises a visual symbol, and the sensor mounted to the AV comprises a camera to capture an image of the visual symbol.

8. A method comprising:
   receiving, from an AV, a beacon signal perceived by the AV, the beacon signal associated with a person in an environment of the AV;
   based on the received beacon signal, retrieving data associated with the beacon signal in a database, the data identifying a condition for authorizing the person associated with the beacon signal to direct behavior of the AV;
   comparing the data identifying the condition for authorizing the person associated with the beacon signal to condition data associated with the AV to determine whether the condition is met by the AV; and
   in response to determining that the condition is met by the AV, transmitting a signal authorizing the person associated with the beacon signal to direct the AV.

9. The method of claim 8, wherein the condition comprises a time period, the method further comprising determining that a current time at a location of the AV is within the time period.

10. The method of claim 8, wherein the condition comprises a geographic area, the method further comprising:
    receiving, from the AV, a location of the person associated with the beacon signal; and
    determining that the location of the person associated with the beacon signal matches the geographic area.

11. The method of claim 8, wherein the condition comprises an expected visual characteristic of the person associated with the beacon signal, the method further comprising:
- receiving, from the AV, data describing a visual characteristic of the person in the environment of the AV; and
- determining that the expected visual characteristic of the person associated with the beacon signal matches the visual characteristic of the person in the environment of the AV.

12. The method of claim 8, wherein the signal authorizing the person associated with the beacon signal to direct the AV comprises a second condition, wherein the AV authorizes the person associated with the beacon signal to direct the AV in response to the second condition being met.

13. The method of claim 8, wherein the database comprises data describing a plurality of authorized personnel, each authorized personnel associated with a respective beacon signal, and at least a portion of the authorized personnel associated with one or more conditions for authorizing the authorized personnel to direct behavior of the AV.

14. The method of claim 8, further comprising:
- receiving, from a device generating the beacon signal, a request for an updated beacon signal; and
- transmitting the updated beacon signal to the device;
- wherein the beacon signal perceived by the AV is the updated beacon signal.

15. An autonomous vehicle (AV) comprising:
- a sensor mounted to the AV, the sensor to receive a beacon signal from an environment of the AV; and
- control circuitry to:
  - perceive a person in the environment of the AV;
  - determine that the perceived person is making a control gesture directed to the AV;
  - in response to determining that the perceived person is making the control gesture, determine that the perceived person is associated with the received beacon signal;
  - in response to determining that the perceived person is associated with the received beacon signal, transmit the beacon signal to an authentication system;
  - receive, from the authentication system, a signal authorizing the perceived person associated with the beacon signal to control behavior of the AV; and
  - in response to receiving the signal authorizing the perceived person to control behavior of the AV, follow the control gesture made by the perceived person directed to the AV.

16. The AV of claim 15, wherein the signal authorizing the perceived person to control behavior of the AV comprises a visual identifier associated with the perceived person, and the control circuitry is further to:
- sense a visual characteristic of the perceived person;
- determine that the visual characteristic matches the visual identifier; and
- follow the control gesture given by the perceived person further in response to determining that the visual characteristic matches the visual identifier.

17. The AV of claim 15, wherein the signal authorizing the perceived person to control behavior of the AV comprises a visual identifier in the environment of the perceived person, and the control circuitry is further to:
- sense, by the AV, a visual characteristic of the environment of the perceived person;
- determine that the visual characteristic matches the visual identifier; and
- follow the control gesture given by the perceived person further in response to determining that the visual characteristic matches the visual identifier.

18. The AV of claim 15, wherein the signal authorizing the perceived person to control behavior of the AV comprises a type of permitted control, and the control circuitry is further to:
- compare the control gesture given by the perceived person to the type of permitted control; and
- follow the control gesture given by the perceived person further in response to determining that the control gesture matches the type of permitted control.

19. The AV of claim 15, wherein the beacon signal is a wireless signal output by an electronic device, and the AV is further configured to transmit a request to the electronic device to transmit the beacon signal to the AV.

20. The AV of claim 15, wherein the beacon signal comprises a visual symbol, and the sensor mounted to the AV comprises a camera to capture an image of the visual symbol.

* * * * *